June 5, 1951     W. F. KOCH     2,555,795

BUMPER GUARD

Filed Oct. 7, 1948

Inventor

William F. Koch

By Clarence A. O'Brien
and Harvey B. Jacobson
Attorneys

Patented June 5, 1951

2,555,795

UNITED STATES PATENT OFFICE 2,555,795

BUMPER GUARD

William F. Koch, Dundee, Ill.

Application October 7, 1948, Serial No. 53,186

3 Claims. (Cl. 293—65)

The present invention relates to a new and novel bumper guard and the object of the invention is to structurally, functionally and otherwise improve upon automotive equipment now in use.

An object of the invention is to provide a simple, economical and reliable guard which, because of its facilities and particular construction insures attainment of wanted ends more satisfactorily than forms and styles of bumper guards currently in use.

Another object of the invention is to provide a sturdy and long lasting guard which, like those in use, is ornamental and well balanced in relation to the bumper and other associated parts and which is, it is believed, more effective because it is characterized by an elastic or resilient cushion, whereby to provide desired impact absorbing properties.

More specifically, novelty is predicated upon a comparatively heavy rubber block or cushion of appropriate shape and dimensions, the same being securely bolted to a backing plate and said plate serving to bridge and securely mount the block on the bumper.

Other objects and advantages will become more readily apparent from the foregoing description and the accompanying illustrative drawings.

Figure 1:
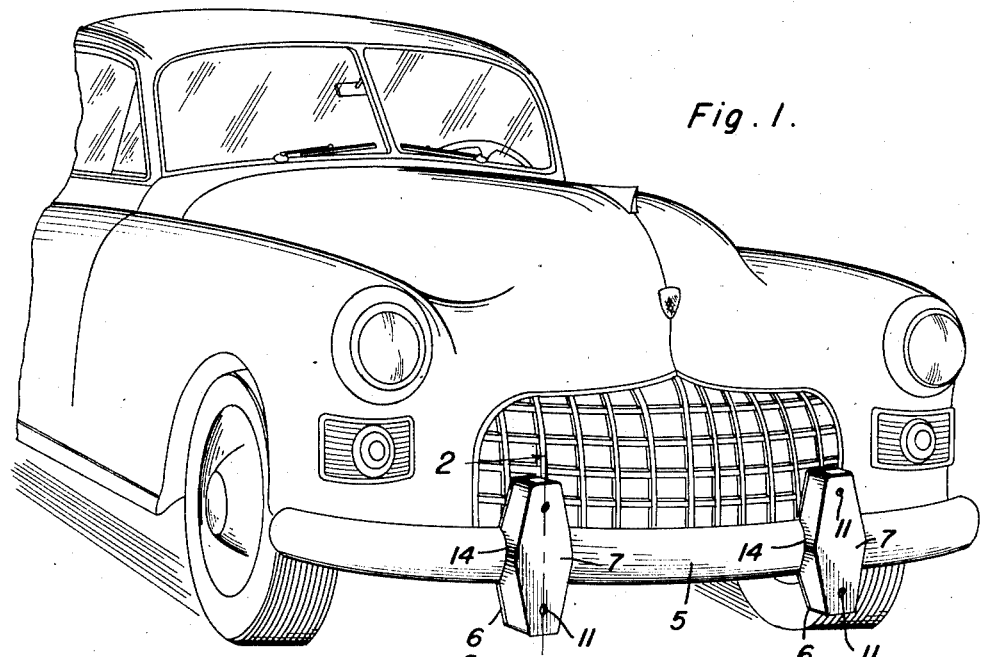
Figure 1 is a fragmentary perspective view of the forward end portion of an automobile showing the bumper and a pair of bumper guards mounted on said bumper, said guards being constructed in accordance with the principles of the present invention.
Figure 2:
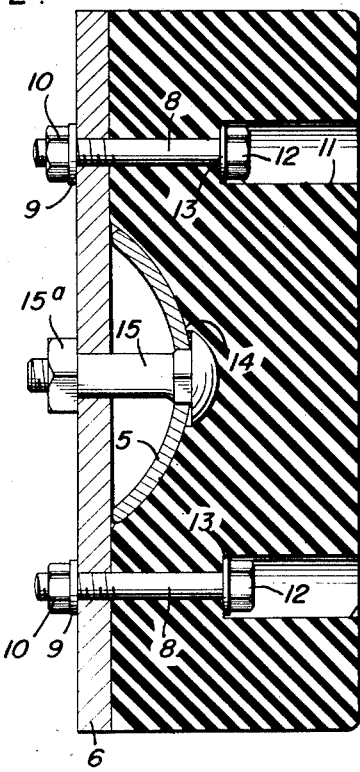
Figure 2 is an enlarged central vertical section taken on the plane of the line 2—2 of Figure 1, looking in the direction of the arrow.
Figure 3:
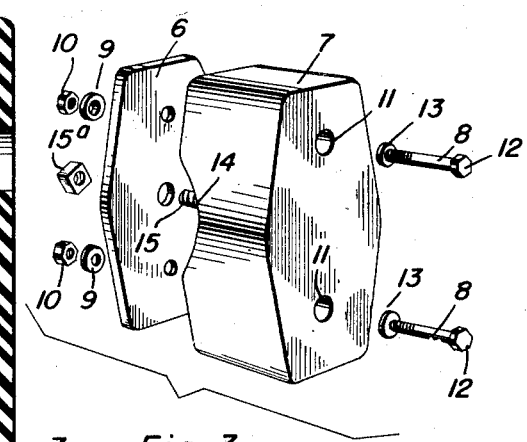
Figure 3 is a group perspective view of an "exploded" type showing all of the parts of my improved bumper guard.

Referring to the drawings and to Figure 2 in particular, the numeral 5 designates a conventional automobile bumper. This is braced by a heavy metal or equivalent backing plate 6 of proportions and shape brought out in Figure 3. The plate serves as a backing and base for the comparatively heavy rubber cushioning block 7. This is of the shape and proportion indicated in the drawings. It is provided at opposite ends with bores to accommodate assembling and retaining bolts 8. The screw threaded end portions of the bolt extend through bolt holes in the backing plate where they are provided with assembling washers 9 and nuts 10. The outer end portions of the bores are counterbored to provide sockets 11 which accommodate the headed ends 12 of the bolts. There is a washer shown at 13. The headed ends of the bolts are well confined in the socket 12 but are nevertheless accessible. The bolts are such in length that the headed ends are "submerged" in the rubber block. This is done to provide requisite protective properties, as is obvious. That face or surface of the block which is opposed to the backing plate is centrally provided with a substantially semi-circular adapter notch 14 which serves to permit the block to be fitted firmly against the bumper and to allow adjacent portions of the backing plate to be clamped or bolted firmly against the longitudinal edge portions of the bumper. Thus, the cushioning block 7 may be correctly positioned on the bumper, the backing plate 6 brought into place and bolted, whereby to permit the guard to be effectively and satisfactorily mounted.

It is believed that solid rubber bumper guards of the type herein shown and described may be manufactured and sold at prices appreciably less than highly ornamented chromium plated steel bumper guards which are commonly used. It is believed to be more resilient than steel and will, it is submitted, absorb shock jars and will afford the user satisfying protection not only for his own car but will minimize the likelihood of damage and marring of other cars in the event of a collision. Bumpers and guards are primarily effective where cars are parked close together or are parked on parking lots and a bumper equipped with my guards will prove out to be mutually advantageous to all concerned.

Attention is directed, at this stage, to numeral 15 which denotes a bolt and an accompanying assembling and retaining nut, the latter denoted by the reference character 15a. This bolt and nut is an optional feature. By preference I employ same and when in use the headed end of the bolt is passed through an opening provided therefor in the bumper 5 and the shank is then passed through an opening provided for same in the aforementioned backing plate 6. The nut is tightened against the backing plate, thus the backing plate is reasonably well mounted and supported on the bumper. Now, it is in readiness for the mounting thereon of the buffer block 7. The latter is attached to the plate 6 as already described. The point that I make here is that although the bolt 15 is optional it is preferred since it provides a satisfactory way of initially fastening the backing plate 6 on the bumper for reception of the bumper guard 7. Incidentally, that part of the rubber block which comes into contact with the head of the bolt may be formed with a concavity or an indentation to adapt itself to said head or the rubber at this point may be made sufficiently compressible to conformingly fit the bolt head.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials or rearrangement of parts may be resorted to in actual practice so long as no departure is made from the invention as claimed.

Having described the invention, what is claimed as new is:

1. In an assemblage of the class described, in combination, an automobile bumper of concavo-convex cross section, a relatively thick and heavy substantially indestructible rubber block constituting a buffer, said block being disposed at right angles to the longitudinal dimension of the bumper and having a notched surface fitted against the convex side of said bumper, said block being provided at opposite ends, above and below said bumper, with bolt holes, a backing plate bridging the concaved side of said bumper, said backing plate having bolt holes lined up with the bolt holes in said block, assembling and retaining bolts mounted in the respective bolt holes and serving to secure the block firmly on the backing plate, and a third bolt anchored on said bumper and fastened to said backing plate.

2. A bumper guard for attachment to an automobile bumper comprising a relatively thick rubber block forming a substantially indestructible resilient buffer, said block being provided at its opposite end portions with bolt holes, portions of said bolt holes being counter bored and providing enlarged sockets, bolts having their shank portions mounted in the bolt holes and the head portions mounted in said sockets, a backing plate fitted against the attachable side of said block, said backing plate having bolt holes, the adjacent end portions of the bolts extending through said bolt holes and being provided with retaining nuts, the intermediate portion of the side of the block facing said backing plate being provided with a semi-circular bumper accommodating notch, and a third bolt carried by the intermediate portion of said backing plate and aligned with said notch, said third bolt being adapted to fasten said plate on said bumper.

3. In an assemblage of the class shown and described, in combination, an automobile bumper of concavo-convex cross-section, a flat rectangular plate abutting and spanning the concaved side of said bumper and having upper and lower end portions projecting above and below the bumper, a bolt passing through said bumper and detachably joined to said plate for removably securing the plate to the bumper, a substantially indestructible rubber block, said rubber block being substantially rectangular and of an area corresponding to that of the plate and having one side formed with a notch into which the convex side of the bumper is fitted with the upper and lower end portions in direct contact with the corresponding upper and lower end portions of said backing plate, and individual bolts accessible from either the plate or block side and carried by said block and detachably connected with said plate, the notched portion of said block normally covering one end of the first-named bolt.

WILLIAM F. KOCH.

REFERENCES CITED

The following references are of record in the file of this patent:

UNITED STATES PATENTS

| Number | Name | Date |
|---|---|---|
| 1,496,967 | Anderson | June 10, 1924 |
| 1,744,408 | Millard | Jan. 21, 1930 |
| 1,881,231 | Jackson | Oct. 4, 1932 |
| 1,896,277 | Barry | Feb. 7, 1933 |
| 2,144,167 | Sanders | Jan. 17, 1939 |
| 2,182,085 | Kellner et al. | Dec. 5, 1939 |
| 2,203,499 | Koubek et al. | June 4, 1940 |
| 2,230,333 | Painter | Feb. 4, 1941 |